United States Patent [19]

Salmon

[11] 4,198,272
[45] Apr. 15, 1980

[54] FUEL SUB-ASSEMBLIES FOR NUCLEAR REACTORS

[75] Inventor: Jonathan S. Salmon, Warrington, England

[73] Assignee: United Kingdom Atomic Energy Authority, London, England

[21] Appl. No.: 907,351

[22] Filed: May 18, 1978

[30] Foreign Application Priority Data

Jun. 3, 1977 [GB] United Kingdom ............... 23753/77

[51] Int. Cl.² .................. G21C 3/00; G21C 3/30
[52] U.S. Cl. .......................... 176/40; 176/50; 176/78
[58] Field of Search .............. 176/50, 61, 78–79, 176/40

[56] References Cited

U.S. PATENT DOCUMENTS

| 3,383,287 | 5/1968 | Jackson | 176/50 |
| 3,671,394 | 6/1972 | Bernath | 176/79 |
| 4,055,199 | 10/1977 | Herman | 176/50 |
| 4,075,058 | 2/1978 | Noyes | 176/50 |

OTHER PUBLICATIONS

*Chamber's Technical Dictionary,* C. F. Tweney and L. E. C. Hughes, ed. W. R. Chambers, Ltd.: p. 205.

Primary Examiner—Charles T. Jordan
Assistant Examiner—Edward F. Miles
Attorney, Agent, or Firm—Larson, Taylor and Hinds

[57] ABSTRACT

In a fuel sub-assembly for a liquid metal cooled fast breeder nuclear reactor comprising a bundle of spaced fuel pins within a tubular wrapper having a spike extension for plugging into fuel assembly support structure the wrapper is pivotally connected to the spike extension.

2 Claims, 3 Drawing Figures

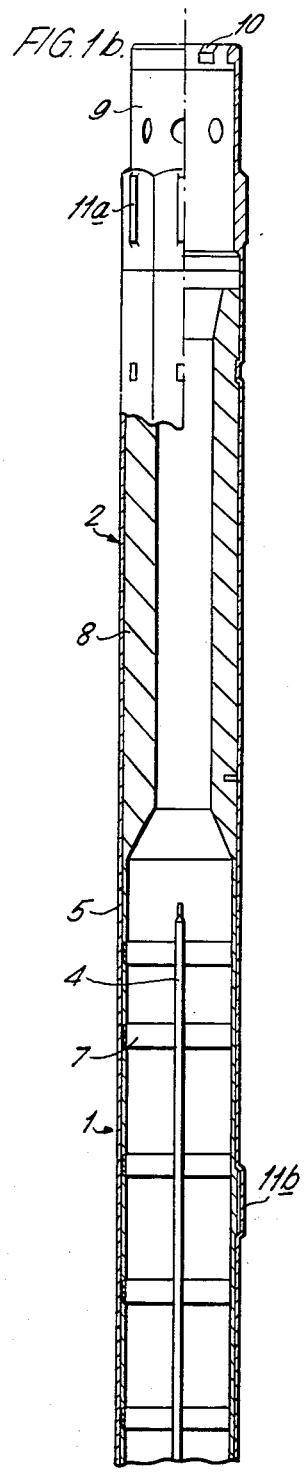
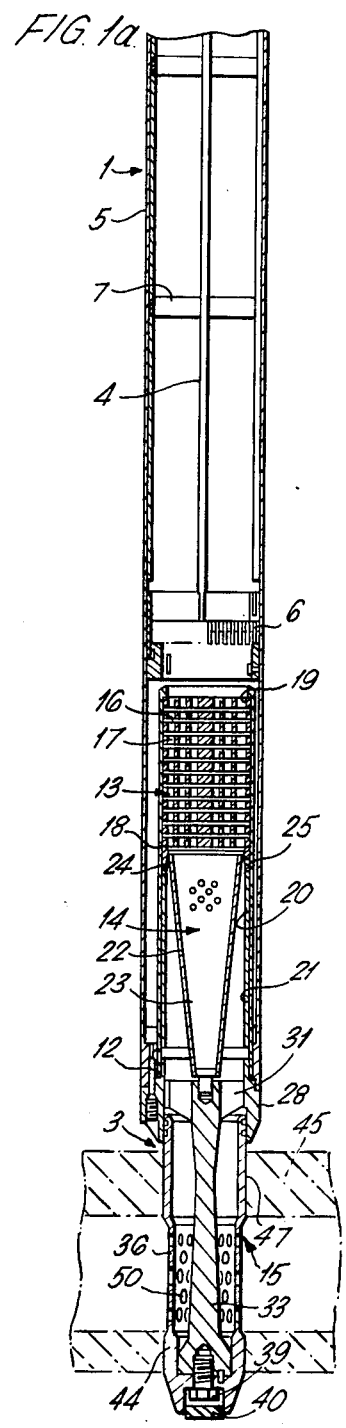

FUEL SUB-ASSEMBLIES FOR NUCLEAR REACTORS

BACKGROUND OF THE INVENTION

This invention relates to fuel sub-assemblies for liquid metal cooled fast breeder nuclear reactors.

A fuel assembly for a liquid metal cooled fast breeder nuclear reactor comprises a bundle of spaced fuel pins within a tubular wrapper or sleeve through which liquid metal coolant can be flowed in heat exchange with the fuel pins. The wrapper is extended at one end by a tubular neutron shield of massive steel and the other end, hereinafter referred to as the lower end, has a spike extension whereby the sub-assembly can be located by plugging into a support structure and arranged with other sub-assemblies to upstand in side-by-side array to form a fuel assembly. Hitherto, it has been proposed, see for example U.S. Pat. No. 3,383,287, to arrange the fuel assembly of a liquid metal cooled fast breeder nuclear reactor in a plurality of groups of sub-assemblies and for the sub-assemblies of each group to be biassed inwardly towards the centre of the group so that the sub-assemblies of the group lean on each other or on a central support member. Whilst such a system has the advantage of elimination of vibrational movement of the sub-assemblies due to coolant flow it is now recommended that the fuel assembly of a liquid metal cooled fast breeder nuclear reactor should be restrained as a whole from the periphery, that is, the fuel sub-assemblies of the fuel assembly should be centripetally urged together in parallel vertical array. For a fuel assembly of this kind some provision should be made to allow lateral displacement of the wrappers of the sub-assemblies relative to the spike extension in order to relieve stresses throughout the fuel assembly.

Accordingly it is an object of the present invention to provide a construction of fuel sub-assembly which has sufficient flexibility to enable some lateral movement of the wrapper relative to the spike extension.

SUMMARY OF THE INVENTION

According to the present invention in a fuel sub-assembly for a liquid metal cooled fast breeder nuclear reactor comprising a bundle of spaced fuel pins within a tubular wrapper having a spike extension for plugging into fuel assembly support structure the wrapper is pivotally connected to the spike extension.

The invention also resides in a liquid metal cooled fast breeder nuclear reactor having a fuel assembly comprising a plurality of closely packed fuel sub-assemblies upstanding in side-by-side array on a support structure and wherein each sub-assembly comprises a bundle of spaced fuel pins within a tubular wrapper having a spike extension for plugging into the support structure and wherein the wrapper is pivotally connected to the spike extension.

The invention provides that lateral displacement of individual fuel pin containing wrappers to accommodate dimensional changes within the fuel assembly is effected by movement of each wrapper relative to its spike extension.

The spike extension of a fuel sub-assembly may conveniently comprise a sleeve providing axially spaced spigot surfaces for engaging vertically spaced sockets in a fuel assembly support structure the wrapper being tied to the sleeve by a resilient tie member extending through the sleeve and having ends encastered, that is fixed to the wrapper and the sleeve.

In a preferred construcion of fuel sub-assembly the end of the tubular wrapper which is connected to the sleeve is arranged to enclose an end region of the sleeve with annular clearance therebetween and the sleeve carries resilient split rings for sealing against liquid metal coolant flow between the wrapper and the sleeve.

DESCRIPTION OF THE DRAWINGS

A construction of fuel sub-assembly embodying the invention is described by way of example with reference to the accompanying drawings wherein:

FIG. 1 is a sectional view of a fuel sub-assembly of hexagonal cross-section shown in two parts designated FIGS. 1a and 1b, the right hand sides of the figures being across flats views whilst the left hand sides are across corners views.

DESCRIPTION OF THE PREFERRED EMBODIMENT

Figure 2:
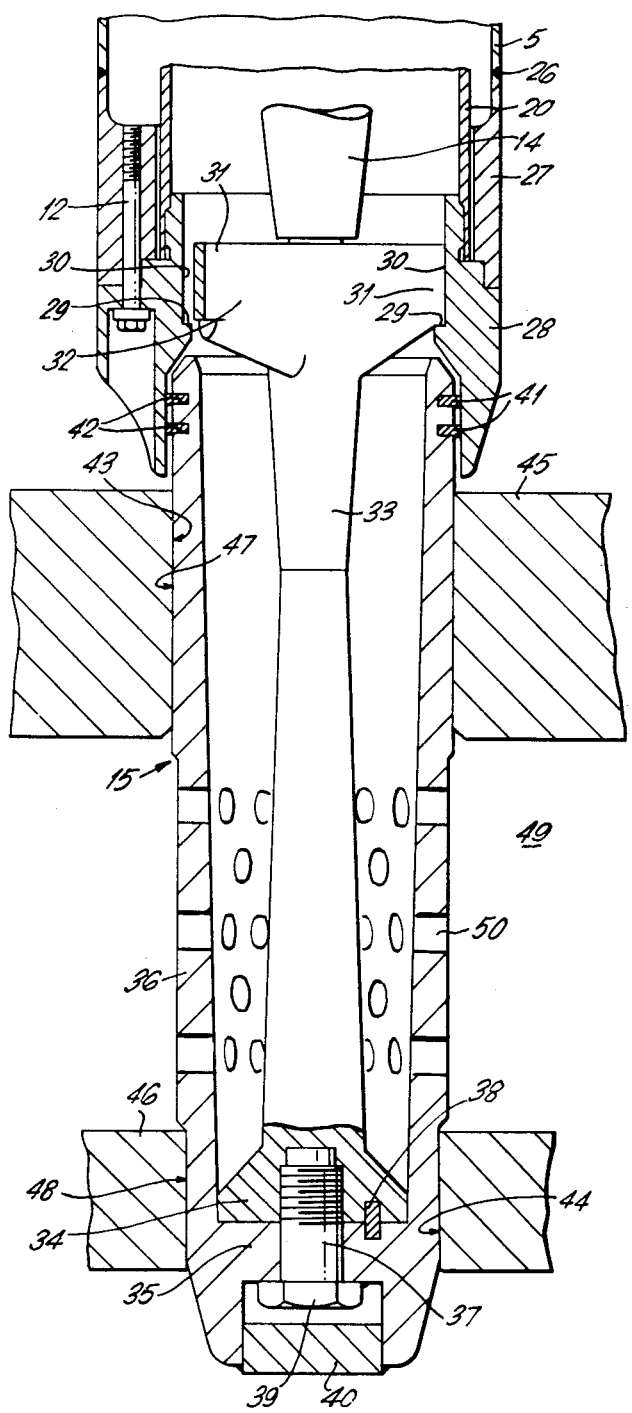
FIG. 2 is a detail of FIG. 1 drawn to a larger scale.

The fuel sub-assembly shown vertically disposed in FIGS. 1a and 1b comprises a fuel section 1, an upper end section 2 and a lower end section 3.

The fuel section 1 comprises a bundle of spaced fuel pins 4 enclosed by a tubular wrapper 5 of hexagonal cross-section. The fuel pins (only one being shown) are supported at their bases by a grid 6 and are laterally supported by cellular grids 7 spaced at intervals along the bundle. The wrapper 5 is extended at each end for adaptation to the upper and lower sections 2, 3.

The upper section 2 comprises a thick walled tube 8 of steel retained within the upper extension of the wrapper and it forms a flow duct for coolant. The tube 8 in combination with corresponding tubes 8 of other fuel sub-assemblies, provides an upper neutron shield for the fuel assembly of a nuclear reactor. The tube 8 carries an end fitting 9 which serves as an outlet port for coolant and has internal lugs 10 for engagement by lifting means for the sub-assembly. Projections 11a, disposed one on each side of a lower hexagonal region of the end fitting, and projections 11b on the wrapper co-operate with corresponding projections on adjacent sub-assemblies in a fuel assembly to space the sub-assemblies apart.

The lower section 3 is secured to the wrapper 5 by set bolts 12. Lower section 3 comprises a flow restricting device 13, a filter element 14 and a spike assembly 15. The flow restricting device 13 comprises a series of wire mesh plates 16 interposed between apertured plates 17 and is housed within a cylindrical barrel 18. The barrel 18 has an internal shoulder 19 at its upper end against which the assembly of mesh and apertured plates 16, 17 are clamped by an internal sleeve 20 having a screw thread engagement 21 with the barrel 18. The filter element 14 comprises a wire mesh 22 supported on the outside of a perforated backing member 23 of generally conical shape, the cone having an open end at its base which is directed towards the flow restricting device within the barrel. The backing member 23 has a flange 24 which makes a close fit with the wall of the sleeve 20 and is secured thereto by radially extending screws 25.

Referring now to FIG. 2 the wrapper 5 is shown welded at 26 to a lower end flange 27 which carries the sleeve 20. A support mounting ring 28, externally of hexagonal shape, is secured to the flange 27 by the set bolts 12.

The ring 28 has a shoulder 29 formed within a bore 30 and the legs 31 of a spider 32, forming the upper end of a spike bar 33, is secured in abutment with the shoulder by welding. In the drawing the spider is three-legged, but more legs can be provided if desired. The bar 33 reduces in cross-section for a minor portion of its length downwardly, and then increases over a major portion of its length downwardly, as shown. The bar terminates at its lower end in a portion 34 of increased diameter, which is secured to the closed end 35 of a closed-ended mounting sleeve 36 by a set bolt 37, a key 38 being provided to prevent relative rotation. The head 39 of the set bolt 37 is counter-sunk in the closed end 35 of the sleeve 36 and the countersink is closed by a plug 40. The bar 33 constitutes a tie member between the wrapper and spike extension and the specific shape of the bar 33 is chosen so that it possesses a desired degree of flexibility.

The upper end of the mounting sleeve 36 is accommodated within the downwardly extending lower end of the ring 28 with annular clearance and a pair of resilient split sealing rings 41 carried in grooves 42 in the sleeve 36 engage the complementary surface of the lower end of ring 28.

The sub-assembly is mounted in cantilever manner in position to extend vertically and to form one unit of the reactor core by engagement of the mounting sleeve 36 in vertically spaced co-axial apertures 43, 44 in an upper plate 45 and a lower plate 46 respectively, these plates being part of the support structure which carried the core of the nuclear reactor. The outer surface of sleeve 36 is made cylindrical at positions 47, 48 to define spigots for engagement with the apertures 43, 44, the lower cylindrical surface 48 being reduced in order to provide location of the sub-assembly in correct axial position as can be seen in the drawing.

The bar 33 as already stated is made with a desired amount of flexibility so that the sub-assembly may exhibit a measure of lateral pivotal movement from the vertical about the lower plate 46, the sleeve 36 being held rigidly whilst the ring 28, fitting 27 and wrapper 5 with its contents being capable of lateral movement as dictated by the flexibility of the bar 33, with the rings 41 permitting relative movement between sleeve 36 and ring 28 whilst retaining a sealing function permitting only a controlled leakage past of liquid sodium. The flow of liquid sodium for extracting heat from the fuel pins takes place from the inlet plenum 49 constituted by the space between plates 45, 46, through inlet ducts 50 in sleeve 36 and flows upwardly past the legs of spider 32 into the sleeve 20 and through the filter 14 to flow over the fuel pins thereabove (one fuel pin being shown) before leaving the sub-assembly and joining the flows from similar sub-assemblies.

It will be appreciated that the degree of lateral pivotal movement which the construction of the sub-assembly permits is made sufficient so that the reactor core constituted by a large number of the sub-assemblies and restrained peripherally, can accommodate the sort of core shape fluctuations predicted to take place during operation both under normal and extended parameters.

I claim:

1. In a liquid metal cooled fast breeder nuclear reactor having a fuel assembly support structure, and a peripherally restrained up-standing fuel sub-assembly, the improvement wherein said sub-assembly comprises:

a bundle of spaced nuclear fuel pins;

a tubular wrapper enclosing said bundle of fuel pins;

a spike extension for the tubular wrapper for plugging the fuel sub-assembly into said fuel assembly support structure, said spike extension comprising a sleeve having axially spaced cylindrical surfaces defining spigots for engaging vertically spaced sockets in the fuel assembly support structure;

said sleeve being spaced from said wrapper and having an end region enclosed by an end region of the wrapper to define an annular clearance therebetween; and an elongate resilient tie member pivotably connecting the tubular wrapper and sleeve, the tie-member extending through the sleeve and having one end rigidly secured to the wrapper and another end rigidly secured to the sleeve.

2. An improved nuclear reactor according to claim 1 wherein the sleeve carries resilient split rings for sealing against liquid metal cooling flow between the wrapper and sleeve.

* * * * *

UNITED STATES PATENT AND TRADEMARK OFFICE
CERTIFICATE OF CORRECTION

PATENT NO. : 4198272
DATED : April 15, 1980
INVENTOR(S) : Salmon, Jonathan Stanley It is certified that error appears in the above-identified patent and that said Letters Patent are hereby corrected as shown below:

Please change the name of the assignee from

"United Kingdom Atomic Energy Authority" to

-- Nuclear Power Company Limited --.

Signed and Sealed this

Fifth Day of August 1980

[SEAL]

Attest:

SIDNEY A. DIAMOND

*Attesting Officer*     *Commissioner of Patents and Trademarks*